(12) United States Patent
He et al.

(10) Patent No.: US 11,206,106 B2
(45) Date of Patent: *Dec. 21, 2021

(54) DATA PACKET SYNCHRONIZATION

(71) Applicant: ZTE Corporation, Guangdong (CN)

(72) Inventors: Qingchun He, Guangdong (CN); Yin Gao, Guangdong (CN); He Huang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 6 days.

This patent is subject to a terminal disclaimer.

(21) Appl. No.: 16/786,985

(22) Filed: Feb. 10, 2020

(65) Prior Publication Data

US 2020/0252164 A1 Aug. 6, 2020

Related U.S. Application Data

(63) Continuation of application No. 16/443,861, filed on Jun. 17, 2019, now Pat. No. 10,560,226, which is a
(Continued)

(30) Foreign Application Priority Data

Jan. 10, 2017 (CN) .......................... 201710018676.7

(51) Int. Cl.
*H04L 12/28* (2006.01)
*H04L 1/16* (2006.01)
(Continued)

(52) U.S. Cl.
CPC .................. *H04L 1/16* (2013.01); *H04L 1/00* (2013.01); *H04L 47/32* (2013.01); *H04W 80/04* (2013.01)

(58) Field of Classification Search
CPC ....... H04L 47/32; H04L 47/323; H04L 47/34; H04L 67/1097; H04W 28/02; H04W 28/0273
(Continued)

(56) References Cited

U.S. PATENT DOCUMENTS 10,951,742 B1 * 3/2021 Morris .................... H04L 69/16
2007/0140151 A1 6/2007 Zriny et al.
(Continued)

FOREIGN PATENT DOCUMENTS

| CN | 103051557 A | 4/2013 |
| CN | 103797743 A | 5/2014 |

(Continued)

OTHER PUBLICATIONS

Extended Search Report dated Dec. 16, 2019 for European Application No. 17891314.1, filed on Dec. 22, 2017 (8 pages).
(Continued)

*Primary Examiner* — John Pezzlo
(74) *Attorney, Agent, or Firm* — Perkins Coie LLP

(57) ABSTRACT

Provided is a data packet transmission method and device. The method includes: generating, by a first network element, first indication information according to a delivery status fed back by a second network element to the first network element, where the first indication information is used for instructing the second network element which has not successfully sent a data packet to a terminal to discard the data packet indicated by the first indication information. The present disclosure may solve the problem in the related art
(Continued)

of unsynchronized data transmission in sending of a data packet to a terminal by a plurality of second network elements.

18 Claims, 10 Drawing Sheets

Related U.S. Application Data continuation of application No. PCT/CN2017/117881, filed on Dec. 22, 2017.

(51) Int. Cl.
  *H04L 12/823*  (2013.01)
  *H04L 1/00*    (2006.01)
  *H04W 80/04*   (2009.01)
  *H04J 1/16*    (2006.01)

(58) Field of Classification Search
  USPC ........ 270/229, 252, 329, 386; 370/229, 252, 370/329, 386
  See application file for complete search history.

(56) References Cited

U.S. PATENT DOCUMENTS

| | | |
|---|---|---|
| 2009/0147738 A1 | 6/2009 | Larsson et al. |
| 2017/0346745 A1* | 11/2017 | Lim .................. H04L 47/34 |
| 2018/0206173 A1 | 7/2018 | Virtej et al. |
| 2019/0053099 A1* | 2/2019 | Kim .................. H04W 76/10 |
| 2019/0268445 A1 | 8/2019 | Zhang et al. |

FOREIGN PATENT DOCUMENTS

| | | |
|---|---|---|
| CN | 105519058 A | 4/2016 |
| EP | 2 916 572 A1 | 9/2015 |

OTHER PUBLICATIONS

International Search Report and Written Opinion dated Mar. 21, 2018 for International Application No. PCT/CN2017/117881, filed on Dec. 22, 2017 (12 pages).

ZTE, "Further Considerations on Split Option 3," 3GPP TSG RAN WG3 Meeting#94, Reno, Nevada, USA, R3-162847, 4 pages, Nov. 2016.

* cited by examiner

DATA PACKET SYNCHRONIZATION

CROSS REFERENCE TO RELATED APPLICATIONS

This patent document is a continuation of and claims benefit of priority to U.S. patent application Ser. No. 16/443,861, filed on Jun. 17, 2019, now U.S. Pat. No. 10,560,226, which is a continuation of International Patent Application No. PCT/CN2017/117881, filed on Dec. 22, 2017, which claims the benefit of priority of Chinese Patent Application No. 201710018676.7, filed on Jan. 10, 2017. The entire contents of the before-mentioned patent applications are incorporated by reference as part of the disclosure of this application.

TECHNICAL FIELD

The present disclosure relates to communications and, in particular, to a data packet transmission method and device.

BACKGROUND

In the fifth generation (5G) mobile communications, massive connections and user's higher rate requirements pose a great challenge to transmission capacity of a common public radio interface (CPRI) between a bandwidth-based unit (BBU) and a regenerative repeater unit (RRU) in the Long Term Evolution (LTE) system. Because a CPRI interface is used for the transmission of an IQ signal subject to processing such as coding and modulation on a physical layer, higher requirements are imposed on a transmission delay and a bandwidth of the CPRI interface. When a 5G air interface has an increased rate of tens of Gbps, the demand for traffic of the CPRI interface will reach a Tbps level, which puts tremendous pressure on network deployment costs and difficulties. Therefore, in the 5G system, the manner to divide a fronthaul interface needs to be redefined. Various aspects such as transmission capacity, the transmission delay and deployment convenience need to be considered in terms of the division of the fronthaul interface. For example, considering the transmission through a non-ideal fronthaul interface, delay-insensitive network functions are implemented in a first network element such as a centralized unit (CU), delay-sensitive network functions are implemented in a second network element such as a distributed unit (DU). The transmission between the first network element and the second network element is performed through an ideal or non-ideal fronthaul interface. The fronthaul interface between the first network element and the second network element is as shown in FIG. 1.

To improve transmission reliability and efficiency, in an implementation scenario, one first network element is connected to two or more second network elements. As shown in FIG. 2, the first network element simultaneously sends a data packet of a user equipment (UE) to multiple second network elements. This may ensure the transmission reliability and transmission efficiency between the first network element and the second network elements and further improve the reliability and efficiency of data transmission between the second network elements and a terminal. In FIG. 2, only when it is ensured that the two second network elements successfully send the data packet to the terminal, the synchronization of the two second network elements in transmission of the data packet can be well maintained. When one second network element successfully sends the data packet and the other second network element does not successfully send the same data packet, the one second network element will start to transmit a new data packet to the terminal and the other second network element is still retransmitting the old data packet, which results in asynchronization of the two second network elements in transmission of the data packet and cannot ensure the reliability and efficiency gains of transmission of the data packet on the two second network elements.

SUMMARY

The embodiments of the present disclosure provide a data packet transmission method and device to at least solve the problem in the related art of unsynchronized data transmission in the sending of a data packet to a terminal through a plurality of second network elements.

An embodiment of the present disclosure provides a data packet transmission method, including: generating, by a first network element, first indication information according to a delivery status fed back by a second network element to the first network element, where the first indication information is used for instructing the second network element which has not successfully sent a data packet to a terminal to discard the data packet indicated by the first indication information.

In one embodiment, before the first network element generates the first indication information according to the delivery status, the method includes: sending, by the second network element, the data packet to the terminal; receiving, by the second network element, the delivery status of the data packet fed back by the terminal; and feeding back, by the second network element, the delivery status to the first network element.

Optionally, the first indication information is used for instructing the second network element which has not successfully sent the data packet to the terminal to discard the data packet indicated by the first indication information in at least one of the following manners: the first indication information is used for instructing the second network element which has not successfully sent the data packet to the terminal to delete the data packet indicated by the first indication information; and the first indication information is used for instructing the second network element which has not successfully sent the data packet to the terminal to send a null data packet to the terminal.

Optionally, in a case where the first indication information is used for instructing the second network element to send the null data packet to the terminal and the second network element has not successfully sent the data packet to the terminal, after the delivery status is fed back to the first network element and the first network element is triggered to generate the first indication information according to the delivery status, the method further includes: adding, by the second network element, null packet indication information to the data packet, where the null packet indication information is used for indicating that the data packet sent to the terminal is the null data packet; and sending, by the second network element, the data packet to the terminal to enable the terminal to delete a packet data unit (PDU) or a PDU segment corresponding to the null data packet in a cache.

Optionally, the first indication information is further used for indicating a sequence number of at least one data packet to be transmitted by the second network element.

Optionally, the first indication information includes at least one of: a sequence number of the data packet, a list of sequence numbers of data packets, an interval segment of sequence numbers corresponding to data packets and a list of interval segments.

Another embodiment of the present disclosure provides a data packet transmission method, including: receiving, by a second network element, a data packet sent by a first network element; generating, by the second network element, second indication information according to a receiving status of the data packet; and sending, by the second network element, the second indication information to the first network element, where the second indication information is used for indicating the receiving status of the data packet.

Optionally, the second indication information is further used for indicating a sequence number of at least one data packet to be transmitted by the second network element.

Optionally, the second indication information is transmitted through an interface between the second network element and the first network element.

Another embodiment of the present disclosure provides a data packet transmission method, including: sending, by a first network element, a same data packet to at least two second network elements; receiving, by the first network element, third indication information fed back by a second network element which has successfully received the same data packet in the at least two second network elements, where the third indication information is used for instructing the first network element to delete the same data packet which has not been successfully sent to an other second network element; and deleting, by the first network element, the same data packet which has not been successfully sent to the other second network element in the at least two second network elements according to the third indication information.

Optionally, the third indication information is further used for indicating a sequence number of at least one data packet to be transmitted by the at least two second network element.

Optionally, the third indication information is transmitted through an interface between the first network element and each of the at least two second network elements.

Another embodiment of the present disclosure provides a data packet transmission device, including a trigger module. The trigger module is configured to trigger a first network element to generate first indication information according to a delivery status fed back by a second network element to the first network element, where the first indication information is used for instructing the second network element which has not successfully sent a data packet to a terminal to discard the data packet indicated by the first indication information.

In one embodiment, the device further includes: a first sending module configured to send the data packet to the terminal; and a first receiving module configured to receive the delivery status of the data packet fed back by the terminal. The trigger module is further configured to feed back the delivery status to the first network element.

Optionally, the first indication information is used for instructing the second network element which has not successfully sent the data packet to the terminal to discard the data packet indicated by the first indication information in at least one of the following manners: the first indication information is used for instructing the second network element which has not successfully sent the data packet to the terminal to delete the data packet indicated by the first indication information; and the first indication information is used for instructing the second network element which has not successfully sent the data packet to the terminal to send a null data packet to the terminal.

Optionally, in a case where the first indication information is used for instructing the second network element which has not successfully sent the data packet to the terminal to send the null data packet to the terminal and the second network element has not successfully sent the data packet to the terminal, after the delivery status is fed back to the first network element and the first network element is triggered to generate the first indication information according to the delivery status, the trigger module is further configured to add null packet indication information to the data packet, where the null packet indication information is used for indicating that the data packet sent to the terminal is the null data packet; and send the data packet to the terminal to enable the terminal to delete a packet data unit (PDU) or a PDU segment corresponding to the null data packet in a cache.

Optionally, the first indication information is further used for indicating a sequence number of at least one data packet to be transmitted by the second network element.

Optionally, the first indication information includes at least one of: a sequence number of the data packet, a list of sequence numbers of data packets, an interval segment of sequence numbers corresponding to data packets and a list of interval segments.

Another embodiment of the present disclosure provides a data packet transmission method, including a second receiving module, which is configured to receive a data packet sent by a first network element; a generation module, which is configured to generate second indication information according to a receiving status of the data packet; and a second sending module, which is configured to send the second indication information to the first network element, where the second indication information is used for indicating the receiving status of the data packet.

Optionally, the second indication information is further used for indicating a sequence number of at least one data packet to be transmitted by a second network element.

Optionally, the second indication information is transmitted through an interface between the second network element and the first network element.

Another embodiment of the present disclosure provides a data packet transmission device, including a third sending module, which is configured to send a same data packet to at least two second network elements; a third receiving module, which is configured to receive third indication information fed back by a second network element which has successfully received the same data packet in the at least two second network elements, where the third indication information is used for instructing to delete the same data packet which has not been successfully sent to an other second network element; and a deletion module, which is configured to delete the same data packet which has not been successfully sent to the other second network element in the at least two second network elements according to the third indication information.

Optionally, the third indication information is further used for indicating a sequence number of at least one data packet to be transmitted by the at least two second network elements.

Optionally, the third indication information is transmitted through an interface between the first network element and each of the at least two second network elements.

Another embodiment of the present disclosure provides a storage medium. The storage medium is configured to store program codes for executing the following steps: a second network element sends a data packet to a terminal; the second network element receives a delivery status of the data packet fed back by the terminal; and the second network element feeds back the delivery status to a first network element and triggers the first network element to generate first indication information according to the delivery status, where the first indication information is used for instructing the second network element which has not successfully sent the data packet to the terminal to discard the data packet indicated by the first indication information.

Optionally, the storage medium is further configured to store program codes for executing the following step: the first indication information is used for instructing the second network element which has not successfully sent the data packet to the terminal to discard the data packet indicated by the first indication information in at least one of the following manners: the first indication information is used for instructing the second network element which has not successfully sent the data packet to the terminal to delete the data packet indicated by the first indication information; and the first indication information is used for instructing the second network element which has not successfully sent the data packet to the terminal to send a null data packet to the terminal.

Optionally, the storage medium is further configured to store program codes for executing the following steps: in a case where the first indication information is used for instructing the second network element which has not successfully sent the data packet to the terminal to send the null data packet to the terminal and the second network element has not successfully sent the data packet to the terminal, after the delivery status is fed back to the first network element and the first network element is triggered to generate the first indication information according to the delivery status, the second network element adds null packet indication information to the data packet, where the null packet indication information is used for indicating that the data packet sent to the terminal is the null data packet; and the second network element sends the data packet to the terminal to enable the terminal to delete a packet data unit (PDU) or a PDU segment corresponding to the null data packet in a cache.

Optionally, the storage medium is further configured to store program codes for executing the following step: the first indication information is further used for indicating a sequence number of at least one data packet to be transmitted by at least two second network elements.

Optionally, the storage medium is further configured to store program codes for executing the following step: the first indication information includes at least one of: a sequence number of the data packet, a list of sequence numbers of data packets, an interval segment of sequence numbers corresponding to data packets and a list of interval segments.

Another embodiment of the present disclosure provides a storage medium. The storage medium is configured to store program codes for executing the following steps: the second network element receives a data packet sent by the first network element; the second network element generates second indication information according to a receiving status of the data packet; and the second network element sends the second indication information to the first network element, where the second indication information is used for indicating the receiving status of the data packet.

Optionally, the storage medium is further configured to store program codes for executing the following step: the second indication information is further used for indicating a sequence number of at least one data packet to be transmitted by the second network element.

Optionally, the storage medium is further configured to store program codes for executing the following step: the second indication information is transmitted through an interface between the second network element and the first network element.

Another embodiment of the present disclosure provides a storage medium. The storage medium is configured to store program codes for executing the following steps: the first network element sends a same data packet to at least two second network elements; the first network element receives third indication information fed back by a second network element which has successfully received the same data packet in the at least two second network elements, where the third indication information is used for instructing the first network element to delete the same data packet which has not been successfully sent to an other second network element; and the first network element deletes the same data packet which has not been successfully sent to the other second network element in the at least two second network elements according to the third indication information.

Optionally, the storage medium is further configured to store program codes for executing the following step: the third indication information is further used for indicating a sequence number of at least one data packet to be transmitted by the at least two second network elements.

Optionally, the storage medium is further configured to store program codes for executing the following step: the third indication information is transmitted through an interface between the first network element and each of the at least two second network elements.

In the present disclosure, the second network element sends the data packet to the terminal; the second network element receives the delivery status of the data packet fed back by the terminal; and the second network element feeds back the delivery status to the first network element and triggers the first network element to generate first indication information according to the delivery status, where the first indication information is used for instructing the second network element which has not successfully sent the data packet to the terminal to discard the data packet indicated by the first indication information. The second network element feeds back the delivery status of the data packet in transmission so that the first network element can instruct the second network element which has not successfully transmitted the data packet to delete the data packet according to the delivery status, thereby avoiding a case where the second network element which has not successfully transmitted the data packet is still transmitting the data packet which has not been successfully transmitted while a second network element which has successfully transmitted the data packet transmits a new data packet. In this way, a plurality of second network elements may synchronously transmit data. Therefore, the present disclosure may solve the problem in the related art of unsynchronized data transmission in the sending of a data packet to a terminal through a plurality of second network elements, ensuring the synchronization of data transmission through the plurality of second network elements and improving data transmission reliability.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in any improper way. In the accompanying drawings.

DETAILED DESCRIPTION

The present disclosure will be described hereinafter in detail with reference to the drawings and in conjunction with the embodiments. It is to be noted that if not in collision, the embodiments and features therein in the present application may be combined with each other.

It is to be noted that the terms "first", "second" and the like in the description, claims and above accompanying drawings of the present disclosure are used to distinguish between similar objects and are not necessarily used to describe a particular order or sequence.

Embodiment 1

Figure 3:
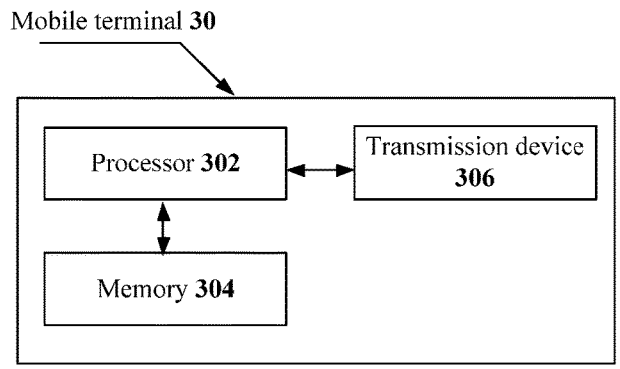
FIG. 3 is a block diagram of hardware of a mobile terminal for a data packet transmission method according to an embodiment of the present disclosure.

A method embodiment provided by the embodiment 1 of the present application may be executed in a mobile terminal, a computer terminal or other similar computing devices. Taking the method to be executed in the mobile terminal as an example, FIG. 3 is a block diagram of hardware of a mobile terminal for a data packet transmission method according to an embodiment of the present disclosure. As shown in FIG. 3, a mobile terminal 30 may include one or more (only one is shown in FIG. 3) processors 302 (the processor 302 may include, but is not limited to, a processing device such as a microprocessor MCU or a programmable logic device FPGA), a memory 304 configured to store data, and a transmission device 306 configured to implement a communication function. It will be understood by those skilled in the art that the structure shown in FIG. 3 is merely illustrative, and not intended to limit the structure of the electronic device described above. For example, the mobile terminal 30 may further include more or fewer components than the components shown in FIG. 3, or has a configuration different from the configuration shown in FIG. 3.

The memory 304 may be configured to store software programs and modules of application software, such as program instructions/modules corresponding to the data packet transmission method in the embodiments of the present disclosure. The processors 302 execute the software programs and modules stored in the memory 304 to perform functional applications and data processing, that is, to implement the method described above. The memory 304 may include a high-speed random access memory, and may further include a nonvolatile memory, such as one or more magnetic storage devices, flash memories or other nonvolatile solid-state memories. In some examples, the memory 304 may include one or more memories which are remotely disposed with respect to the processor 302 and these remote memories may be connected to the mobile terminal 30 via a network. Examples of such a network include, but are not limited to, the Internet, intranets, local area networks, mobile communication networks, and combinations thereof.

The transmission device 306 is configured to receive or send data via a network. Examples of such a network may include a wireless network provided by a communication provider of the mobile terminal 30. In one example, the transmission device 306 includes a network interface controller (NIC), which may be connected to other network devices via a base station and thus be capable of communicating with the Internet. In one example, the transmission 306 may be a radio frequency (RF) module, which is configured to communicate with the Internet in a wireless way.

Figure 4:
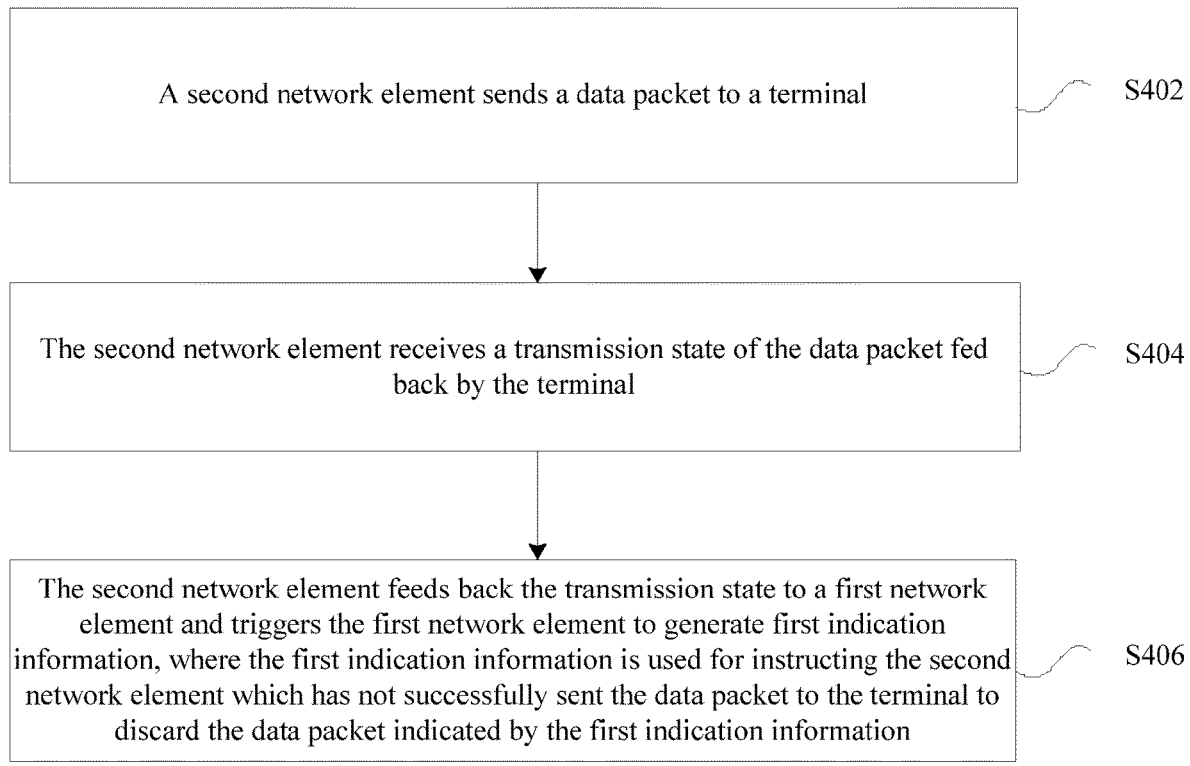
FIG. 4 is a flowchart 1 of a data packet transmission method according to an embodiment of the present disclosure.

This embodiment provides a data packet transmission method to be executed in the mobile terminal described above. FIG. 4 is a flowchart 1 of a data packet transmission method according to an embodiment of the present disclosure. As shown in FIG. 4, the method includes the steps described below.

In step S402, a second network element sends a data packet to a terminal.

In step S404, the second network element receives a delivery status of the data packet fed back by the terminal.

In step S406, the second network element feeds back the delivery status to a first network element and triggers the first network element to generate first indication information according to the delivery status, where the first indication information is used for instructing the second network element which has not successfully sent the data packet to the terminal to discard the data packet indicated by the first indication information.

In the above steps, the second network element feeds back the delivery status of the data packet in transmission so that the first network element may instruct the second network element which has not successfully transmitted the data packet to delete the data packet according to the delivery status, thereby avoiding a case where the second network element which has not successfully transmitted the data packet is still transmitting the data packet which has not been successfully transmitted while a second network element which has successfully transmitted the data packet transmits a new data packet. In this way, a plurality of second network elements may synchronously transmit data. Therefore, the present disclosure may solve the problem in the related art of unsynchronized data transmission in the sending of a data packet is sent to a terminal through a plurality of second network elements, ensuring the synchronization of data transmission through the plurality of second network elements and improving data transmission reliability.

Optionally, the first indication information is used for instructing the second network element which has not successfully sent the data packet to the terminal to discard the data packet indicated by the first indication information in at least one of the following manners: the first indication information is used for instructing the second network element which has not successfully sent the data packet to the terminal to delete the data packet indicated by the first indication information; and the first indication information is used for instructing the second network element which has not successfully sent the data packet to the terminal to send a null data packet to the terminal.

Optionally, in a case where the first indication information is used for instructing the second network element which has not successfully sent the data packet to the terminal to send the null data packet to the terminal and the second network element has not successfully sent the data packet to the terminal, after the delivery status is fed back to the first network element and the first network element is triggered to generate the first indication information according to the delivery status, the method further includes that the second network element adds null packet indication information to the data packet, where the null packet indication information is used for indicating that the data packet sent to the terminal is the null data packet; and that the second network element sends the data packet to the terminal to enable the terminal to delete a packet data unit (PDU) or a PDU segment corresponding to the null data packet in a cache.

Optionally, the first indication information is further used for indicating a sequence number of at least one data packet to be transmitted by at least two second network elements.

Optionally, the first indication information includes at least one of: a sequence number of the data packet, a list of sequence numbers of data packets, an interval segment of sequence numbers corresponding to data packets and a list of interval segments.

For example, the first network element generates the first indication information according to sending status feedback information from the second network element. The first indication information is used for instructing the second network element to delete a specified data packet. The sending status feedback information includes at least one of: a data delivery status of the second network element and a sequence number of a next new data packet to be transmitted.

For another example, after the first network element successfully receives the data packet from the second network element, the first network element may instruct all other second network elements which have not successfully sent the data packet to delete the data packet which has been successfully received by the first network element.

Optionally, the terminal may be notified of information of a null packet via control signaling.

Figure 5:
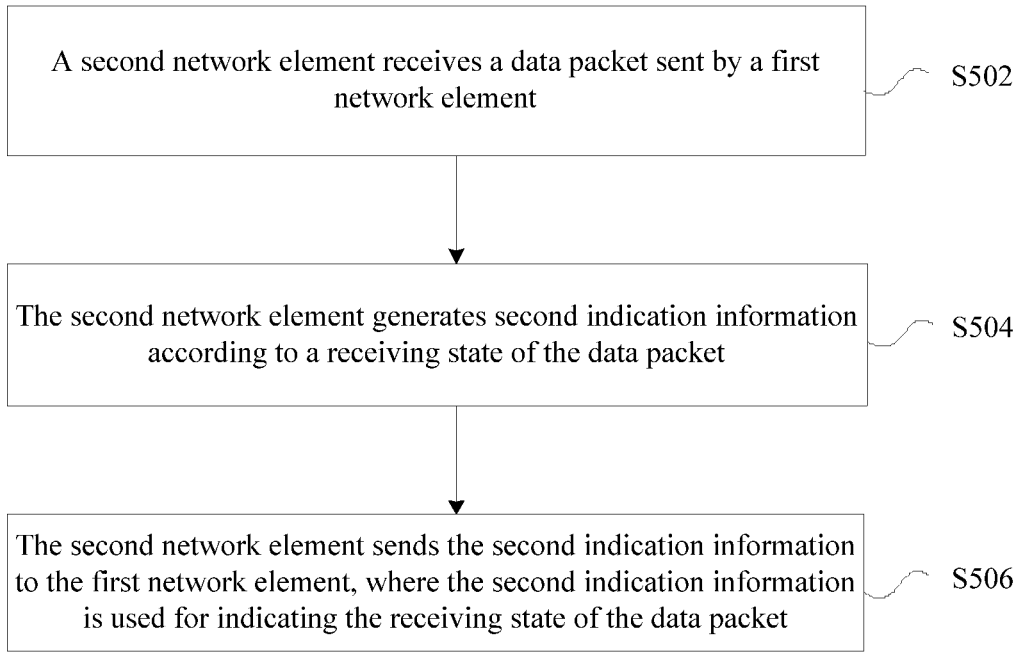
FIG. 5 is a flowchart 2 of a data packet transmission method according to an embodiment of the present disclosure.

FIG. 5 is a flowchart 2 of a data packet transmission method according to an embodiment of the present disclosure. As shown in FIG. 5, the method includes the steps described below.

In step S502, a second network element receives a data packet sent by a first network element.

In step S504, the second network element generates second indication information according to a receiving status of the data packet.

In step S506, the second network element sends the second indication information to the first network element, where the second indication information is used for indicating the receiving status of the data packet.

In the above steps, the second network element feeds back the receiving status of the data packet to the first network element through the second indication information so that the first network element may learn the delivery status of the data packet, thereby avoiding repeated transmission of the data packet by the first network element when the data packet has been successfully transmitted. This ensures the data transmission reliability between the first network element and the second network element and further ensures the data transmission reliability from the second network element to the terminal. Therefore, the present disclosure may solve the problem in the related art of the unsynchronized data transmission in sending of the data packet to the terminal by the plurality of second network elements, ensuring the synchronization of data transmission through the plurality of second network elements and improving the data transmission reliability.

Optionally, the second indication information is further used for indicating a sequence number of at least one data packet to be transmitted by the second network element.

Optionally, the second indication information is transmitted through an interface between the second network element and the first network element.

Figure 6:
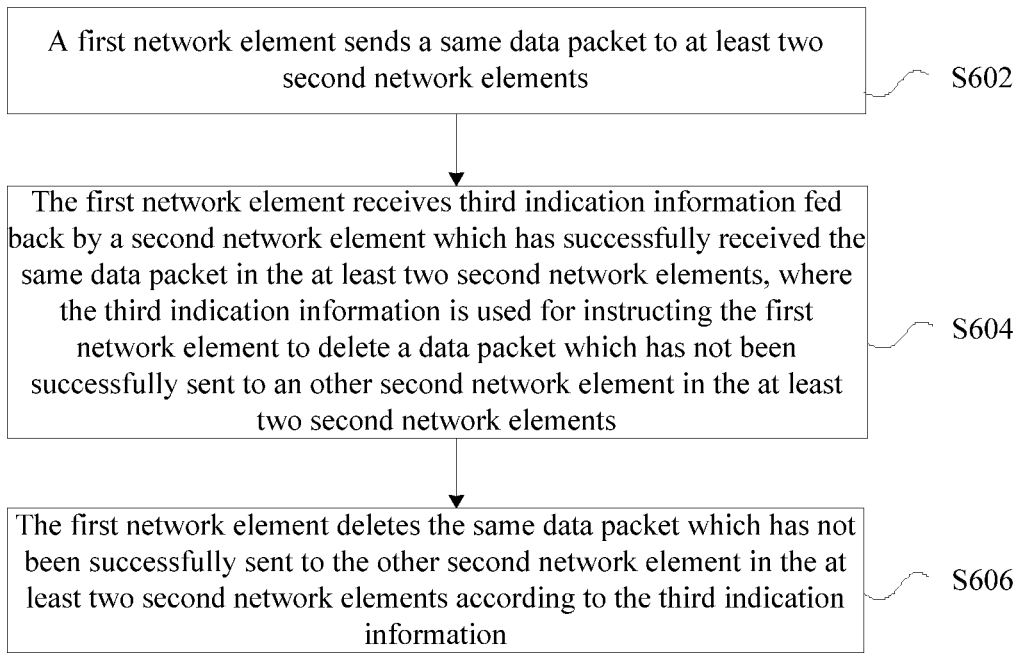
FIG. 6 is a flowchart 3 of a data packet transmission method according to an embodiment of the present disclosure.

FIG. 6 is a flowchart 3 of a data packet transmission method according to an embodiment of the present disclosure. As shown in FIG. 6, the method includes the steps described below.

In step S602, the first network element sends a same data packet to at least two second network elements.

In step S604, the first network element receives third indication information fed back by a second network element which has successfully received the same data packet in the at least two second network elements, where the third indication information is used for instructing the first network element to delete the same data packet which has not been successfully sent to other second network elements in the at least two second network elements.

In step S606, the first network element deletes the same data packet which has not been successfully sent to the other second network elements in the at least two second network elements according to the third indication information.

In the above steps, the second network element which has successfully received the data packet feeds back the third indication information used for instructing to delete the same data packet which has not been successfully sent to the other second network element, thereby avoiding a case where the first network element repeatedly transmits the old data packet when it has been successfully received, which makes the first network element still transmit the old data packet to a second network element which has not successfully transmitted the old data packet while transmitting a new data packet to a second network element which has successfully transmitted the old data packet. This ensures the synchronization of transmitting a data packet to the terminal. Therefore, the present disclosure may solve the problem in the related art of the unsynchronized data transmission in sending of the data packet to the terminal by the plurality of second network elements, ensuring the synchronization of data transmission through the plurality of second network elements and improving the data transmission reliability.

Optionally, the third indication information is further used for indicating a sequence number of at least one data packet to be transmitted by the at least two second network elements.

Optionally, the third indication information is transmitted through an interface between the first network element and each of the at least two second network elements.

Optionally, the method further includes that the second network element instructs the first network element to delete the same data packet to be sent by the other second network element through fourth indication information after the second network element has successfully received the data packet from the first network element.

Optionally, the interface between the first network element and the second network element in the above embodiment may be a fronthaul interface.

It is to be noted that the two methods described hereinbefore may be considered to be respectively implemented by a sending end and a receiving end. The sending end has functions including generating the first indication information, discarding or generating the null data packet and sending the null packet to the receiving end. The receiving end has functions including receiving the null data packet, and discarding or deleting the PDU or the PDU segment corresponding to a sequence number of the null data packet in the cache.

A detailed description is given below to facilitate the understanding of the above embodiment.

Figure 1:
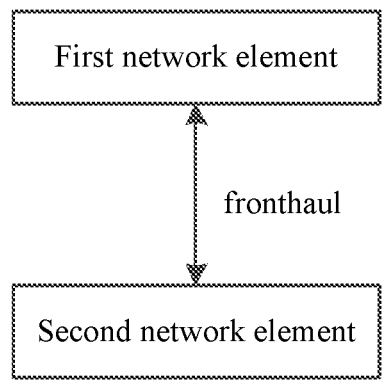
FIG. 1 is a schematic diagram of a fronthaul interface between a first network element and a second network element in the related art.

FIG. 1 is a schematic diagram of a fronthaul interface between a first network element and a second network element in the related art. As shown in FIG. 1, information interactions are performed between the first network element and the second network element through the fronthaul interface. For different delays, the fronthaul here may be ideal or non-ideal. The ideal fronthaul has a relatively small transmission delay of, for example, tens or hundreds of microseconds. The non-ideal fronthaul has a relatively large transmission delay of, for example, milliseconds. The distinction between the ideal fronthaul and the non-ideal fronthaul results in different function divisions between the first network element and the second network element. That is, in a case of non-ideal fronthaul transmission, a delay-sensitive user plane function, such as a function closely correlated to scheduling, needs to be implemented in the second network element, and a delay-insensitive function such as header compression, encryption and integrity inclusion, needs to be implemented in the first network element to meet requirements on transmission delay.

Figure 2:
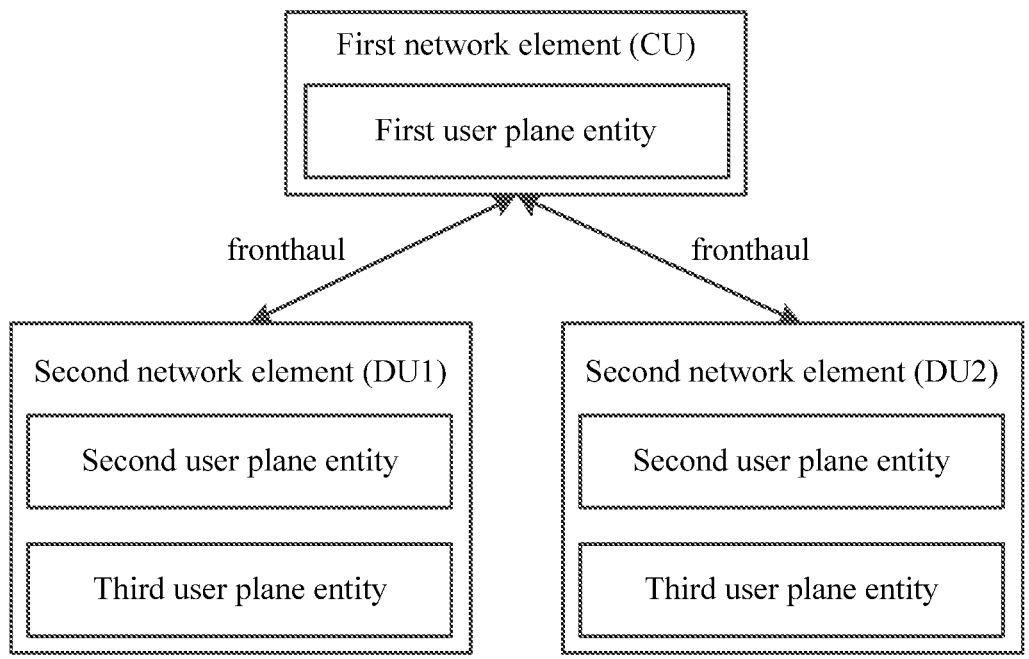
FIG. 2 is a schematic diagram of connection between a first network element and a plurality of second network elements in the related art.

FIG. 2 is a schematic diagram of connection between a first network element and a plurality of second network elements in the related art. As shown in FIG. 2, a first user plane entity is disposed in the first network element, a second user plane entity and a third user plane entity are disposed in the second network element, and the first network element is connected to the second network element through the fronthaul interface defined as, for example, an "NGx" interface. A plurality of second network elements is centrally controlled by the first network element and there is no direct interface between the second network elements. In FIG. 2, a second network element DU1 and a second network element DU2 are used for distinguishing between two different second network elements. The first user plane entity has a function similar to a Packet Data Convergence Protocol (PDCP) of the LTE system and its enhanced function, the second user plane entity has a function similar to radio link control (RLC) of the LTE system and its enhanced function, and the third user plane entity has a function similar to medium access control (MAC) of the LTE system and its enhanced function. It is to be noted that FIG. 2 only illustrates a case where one first network element is connected to a plurality second network elements, and it is not limited that the first network element only includes the first user plane entity and the second network element only includes the second user plane entity and third user plane entity.

Figure 7:
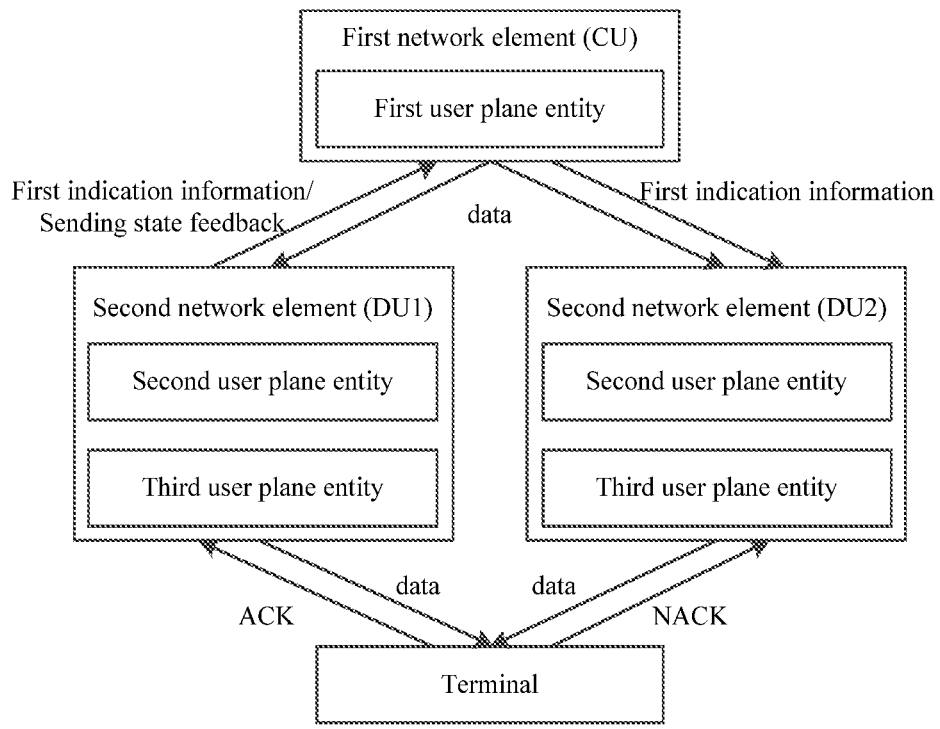
FIG. 7 is a schematic diagram of connection architecture between among network elements and a terminal according to an embodiment of the present disclosure.

FIG. 7 is a schematic diagram of connection architecture among network elements and a terminal according to an embodiment of the present disclosure. As shown in FIG. 7, two scenarios are included. One scenario is the transmission of the data packet between the first network element and the second network elements, and the other is the transmission of the data packet between the second network elements and the terminal. The instruction and control of the first indication information may improve data transmission efficiency and reliability.

The first network element simultaneously sends the same data packet to two second network elements, and the second network element DU1 sends the first indication information to the first network element after successfully receiving the data packet from the first network element. The first indication information is used for instructing the first network element to discard or delete the data packet which has not been successfully sent to the second network element DU2 but has been successfully sent to the second network element DU1. Optionally, the first indication information is further used for instructing the first network element whether to retransmit the data packet or to transmit a new data packet.

The second network element DU1 sends sending status feedback information of the data packet to the terminal to the first network element. The first network element generates the first indication information according to the sending status feedback information from the DU1 to instruct the second network element DU2 to delete the data packet which has been successfully sent to the terminal by the second network element DU1 and has not been successfully sent by the DU2.

The first indication information may be one of: a sequence number, a list of sequence numbers, an interval segment and a list of interval segments.

In one embodiment, the second network element sends the received data packet to the terminal. In addition, the first network element instructs the second network element DU2 to discard or delete the data which has not been successfully sent according to feedback information of a status of sending from the second network element to the terminal, to achieve the synchronized transmission of data by the second network element DU1 and the second network element DU2 to the terminal.

Figure 8:
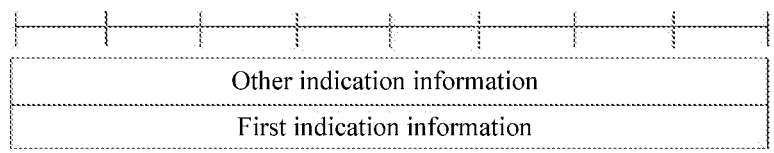
FIG. 8 is a schematic diagram illustrating a PDU frame structure of first indication information transmitted between a first network element and a second network element according to an embodiment of the present disclosure.

FIG. 8 is a schematic diagram illustrating a PDU frame structure of first indication information transmitted between a first network element and a second network element according to an embodiment of the present disclosure. As shown in FIG. 8, an indication information packet may include at least one of: type information of a data packet, length indication information of the data packet and a sequence number corresponding to the data packet. The first indication information may be one of: a sequence number, a list of sequence numbers, an interval segment and a list of interval segments.

Figure 9:
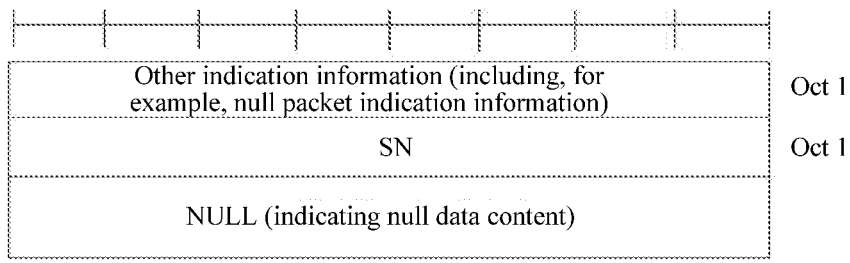
FIG. 9 is a schematic diagram 1 illustrating a PDU frame structure of a null data packet transmitted between a second network element and a terminal according to an embodiment of the present disclosure.

FIG. 9 is a schematic diagram 1 illustrating a PDU frame structure of a null data packet transmitted between a second network element and a terminal according to an embodiment of the present disclosure. As shown in FIG. 9, the PDU frame structure adopts a frame structure similar to the RLC, and the null packet indication information is added to PDU header information to indicate that data content corresponding to the sequence number is null. In addition to the null packet indication information, the PDU header information further includes at least one of: segmentation and/or re-segmentation indication information, a sequence number, one or more pieces of length indication information and a segment offset.

Figure 10:
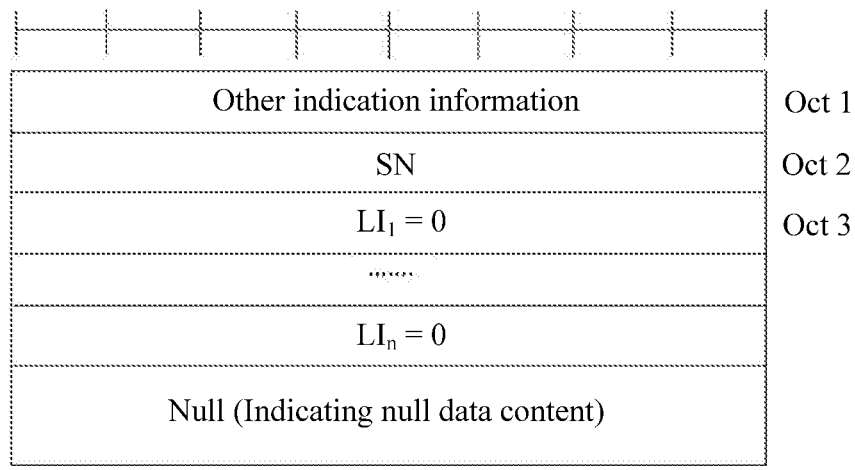
FIG. 10 is a schematic diagram 2 illustrating a PDU frame structure of a null data packet transmitted between a second network element and a terminal according to an embodiment of the present disclosure.

FIG. 10 is a schematic diagram 2 illustrating a PDU frame structure of a null data packet transmitted between a second network element and a terminal according to an embodiment of the present disclosure. As shown in FIG. 10, the PDU frame structure adopts the frame structure similar to the RLC, and the PDU header information includes at least one of: the segmentation and/or re-segmentation indication information, the sequence number, the one or more pieces of length indication information and the segment offset. The length indication information may be set to "0" to indicate that the sequence number corresponds to the null packet.

Figure 11:
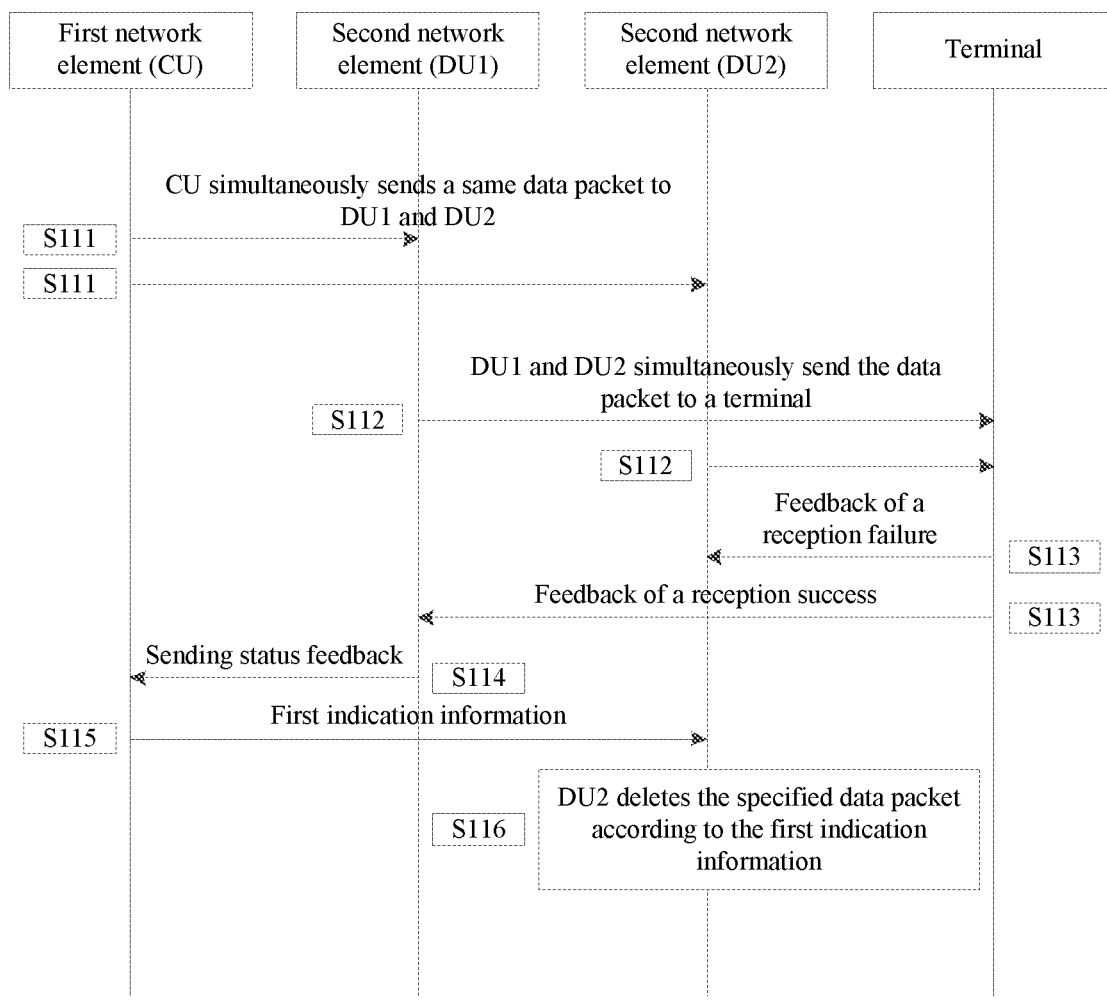
FIG. 11 is a schematic diagram 1 illustrating a generation process of first indication information according to an embodiment of the present disclosure.

FIG. 11 is a schematic diagram 1 illustrating a generation process of first indication information according to an embodiment of the present disclosure. As shown in FIG. 11, to adapt to a low-delay high-reliability scenario of services, the same data packet needs to be simultaneously transmitted on a plurality of links to improve transmission reliability. This embodiment describes how the first indication information is generated and an operation of the second network element after receiving the first indication information. The scenario may be applied to a scenario of high data transmission reliability and a low transmission delay, for example, an Ultra-Reliable and Low Latency Communications (URLLC) scenario. The first network element sends the first indication information to the second network elements to achieve the synchronization of data transmission through the second network elements and improve the data transmission efficiency. The process may include the steps described below.

In step S111, a first network element CU simultaneously sends a same data packet to a second network element DU1 and a second network element DU2. The first network element is connected to each second network element through a fronthaul interface. Here, the fronthaul interface is defined as the "NGx" interface for convenience of description.

In step S112, the second network element DU1 and the second network element DU2 both simultaneously send the data packet to a terminal. The data packet is a complete PDU or a PDU segment.

In step S113, the terminal feeds back feedback information of a reception failure to the second network element DU2 and feeds back feedback information of a reception success to the second network element DU1. The terminal feeds back the receiving status of the data packet to the second network element DU1 and the second network element DU2, respectively.

In step S114, the second network element DU1 reports sending status feedback information to the first network element. The sending status feedback information includes at least one of: a data delivery status of the second network element and a sequence number of a next new data packet to be transmitted.

In step S115, the first network element generates first indication information according to the sending status feedback information in step S114 and sends the first indication information to the second network element DU2. The PDU frame structure of the first indication information transmitted between the first network element and the second network element is as shown in FIG. 8. For example, the first indication information may be one of: a sequence number, a list of sequence numbers, an interval segment and a list of interval segments.

The first indication information is used for instructing the second network element to delete the data packet indicated by the first indication information, and/or the first indication information is used for indicating the sequence number of the next new data packet to be transmitted by the second network element.

In step S116, a second network element DU2 deletes the specified data packet according to an instruction of the first indication information.

Optionally, the deletion may refer to discarding the data packet or configuring the data packet as a null packet.

Figure 12:
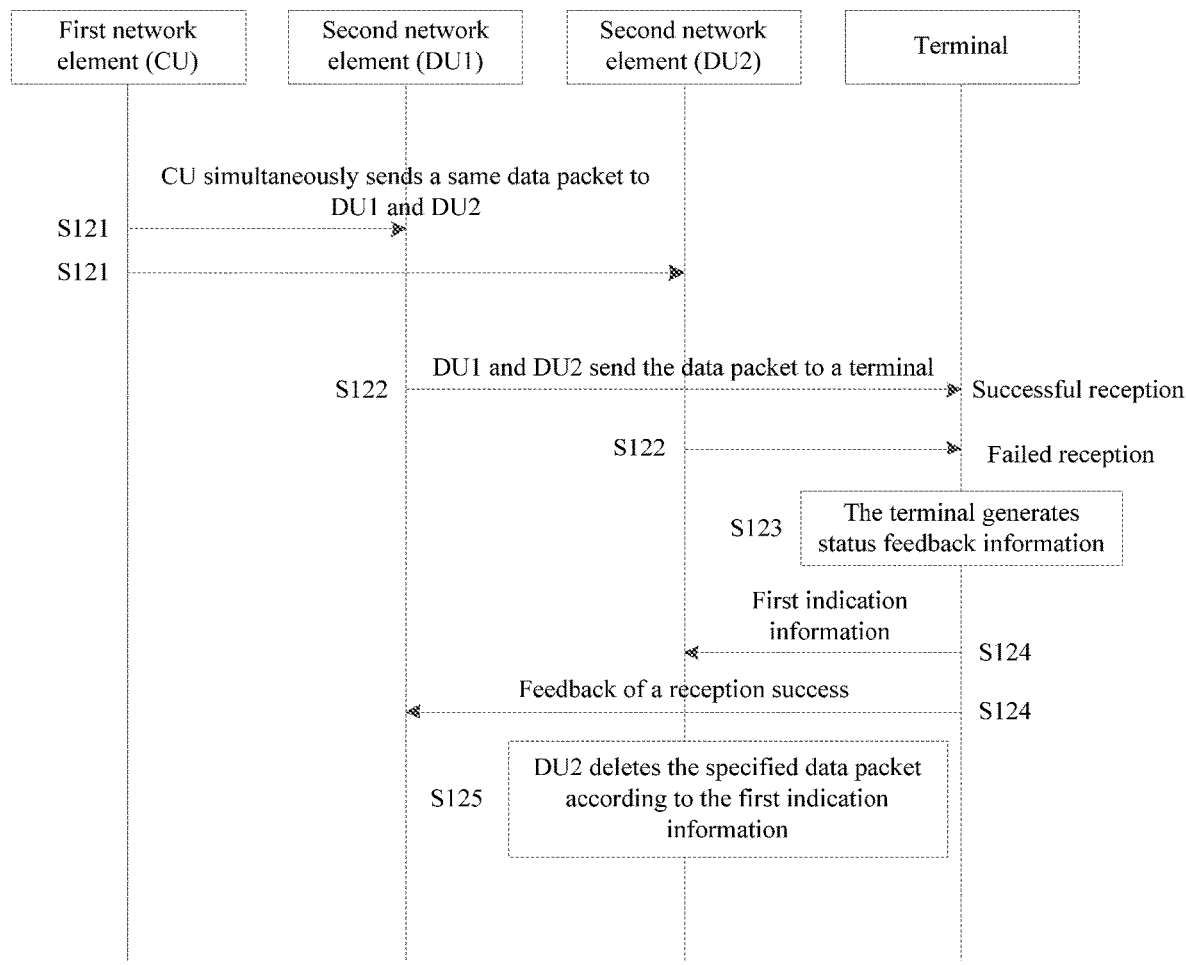
FIG. 12 is a schematic diagram 2 illustrating a generation process of first indication information according to an embodiment of the present disclosure.

FIG. 12 is a schematic diagram 2 illustrating a generation process of first indication information according to an embodiment of the present disclosure. FIG. 12 differs from FIG. 11 in that the terminal generates the first indication information according to the receiving status of the data packet sent by the second network element, where the first indication information is used for instructing the second network element to delete the specified data packet. The process may include the steps described below.

In step S121, a first network element CU simultaneously sends a same data packet to a second network element DU1 and a second network element DU2.

In step S122, the second network element DU1 and the second network element DU2 both send the data packet to a terminal.

In step S123, the terminal generates status feedback information. The terminal generates first indication information according to acknowledgment status information on a successful link. The first indication information is configured to instruct a second network element to delete the data packet indicated by the first indication information.

Optionally, the method for generating status feedback by the terminal includes performing XOR processing on receiving status of data on two links to generate new status feedback information.

Optionally, the terminal generates status report information for each link.

In step S124, the terminal sends the first indication information to the second network element DU2 and sends the feedback information of the reception success to the second network element DU1. The PDU frame structure of the first indication information transmitted between the first network element and the second network elements is as shown in FIG. 8.

The first indication information may be one of: a sequence number, a list of sequence numbers, an interval segment and a list of interval segments.

The first indication information is used for instructing the second network element to delete the data packet indicated by the first indication information, and/or the first indication information is used for indicating the sequence number of the next new data packet to be transmitted by the second network element.

Optionally, if the terminal receives the data packet correctly from one second network element, the terminal sends an acknowledgement message to the two second network elements.

Optionally, the terminal feeds back status information to each second network element according to the respective receiving status of the second network element, so that the DU which has not successfully transmitted the data packet will perform retransmission of the data packet. In this case, the problem of the synchronization of data transmission may be solved by the method shown in FIG. 11.

In step S125, the second network element DU2 deletes the data packet according to the instruction of the first indication information.

Optionally, the deletion may refer to discarding the data packet or to configuring the data packet as the null packet.

Figure 13:
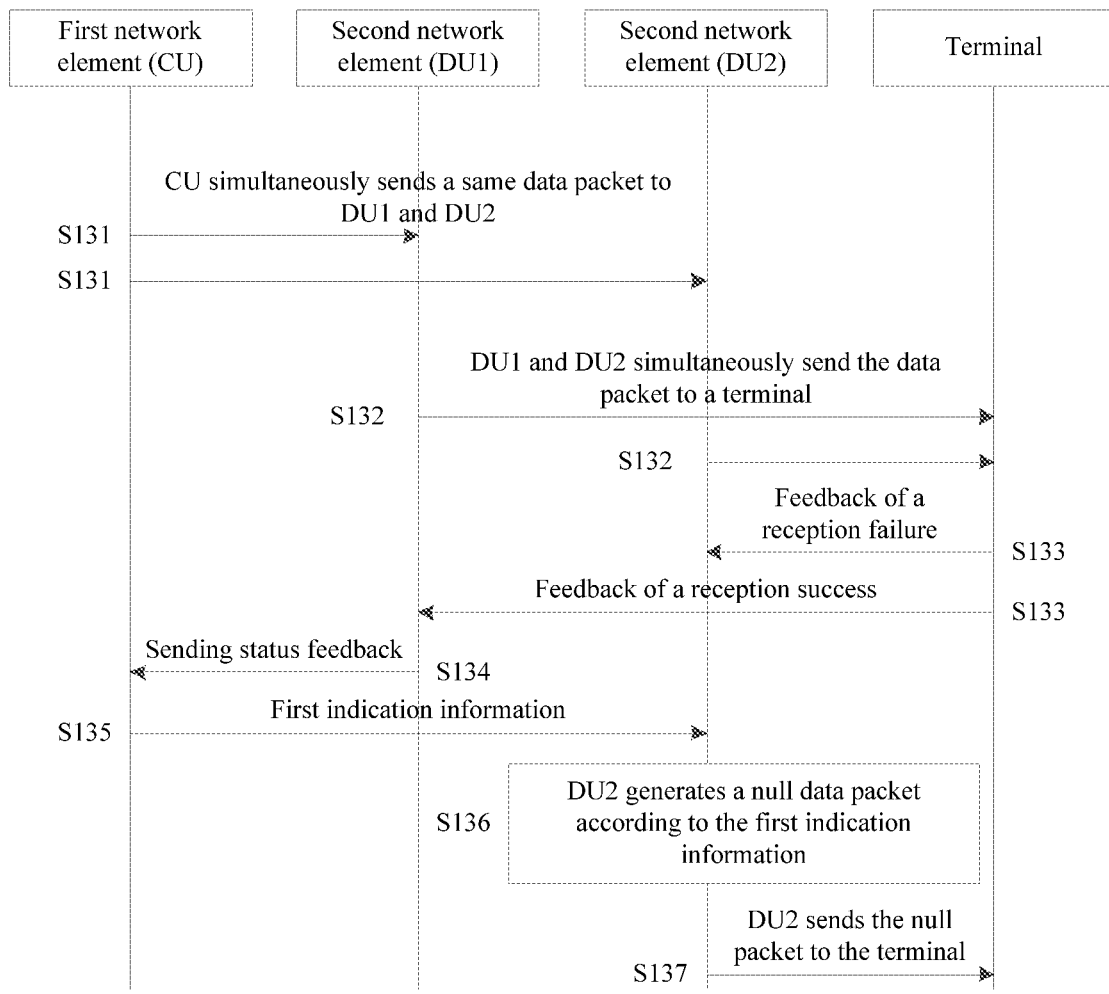
FIG. 13 is a schematic diagram illustrating that a data packet is indicated to be a null packet by adding null packet indication information to the data packet according to an embodiment of the present disclosure.

FIG. 13 is a schematic diagram illustrating that a data packet is indicated to be a null packet by adding null packet indication information to the data packet according to an embodiment of the present disclosure. As shown in FIG. 13, this embodiment describes that the second network element adds a null packet indication to the PDU so that the terminal discards or deletes the data packet according to the null packet indication information in a PDU header. The steps described below are included.

In step S131, a first network element CU simultaneously sends a same data packet to a second network element DU1 and a second network element DU2. The first network element is connected to each second network element through the fronthaul interface. Here, the fronthaul interface is defined as the "NGx" interface for convenience of description.

In step S132, the second network element DU1 and the second network element DU2 both simultaneously send the data packet to the terminal. The data packet is a complete PDU or a PDU segment.

In step S133, the terminal feeds back feedback information of a reception failure to the second network element DU2 and feeds back feedback information of a reception success to the second network element DU1. The terminal feeds back the receiving status of the data packet to the second network element DU1 and the second network element DU2, respectively.

In step S134, the second network element DU1 reports the sending status feedback information to the first network element.

In step S135, the first network element generates the first indication information according to the sending status feedback information in step S134 and sends the first indication information to the second network element DU2. The sending status feedback information includes at least one of: the data delivery status of the second network element and the sequence number of the next new data packet to be transmitted.

The first indication information may be one of: a sequence number, a list of sequence numbers, an interval segment and a list of interval segments.

The first indication information is used for instructing the second network element to delete the data packet indicated by the first indication information, and/or the first indication information is used for indicating the sequence number of the next new data packet to be transmitted by the second network element.

In step S136, the second network element DU2 generates the null data packet according to the instruction of the first indication information. The second network element DU2 adds null packet indication information to PDU header information. The PDU frame structure of the null data packet is as shown in FIG. 9.

Optionally, the second network element DU2 sets the length indication information in the PDU header to "0" to indicate that the data packet is a null packet. The PDU frame structure is as shown in FIG. 10.

Optionally, the second network element DU2 discards the data packet indicated by the first indication information according to the indication of the first indication information.

In step S137, the second network element DU2 sends the null packet to the terminal.

Optionally, after receiving the null packet, the terminal deletes the locally cached data PDU or PDU segment corresponding to the sequence number of the null packet.

Figure 14:
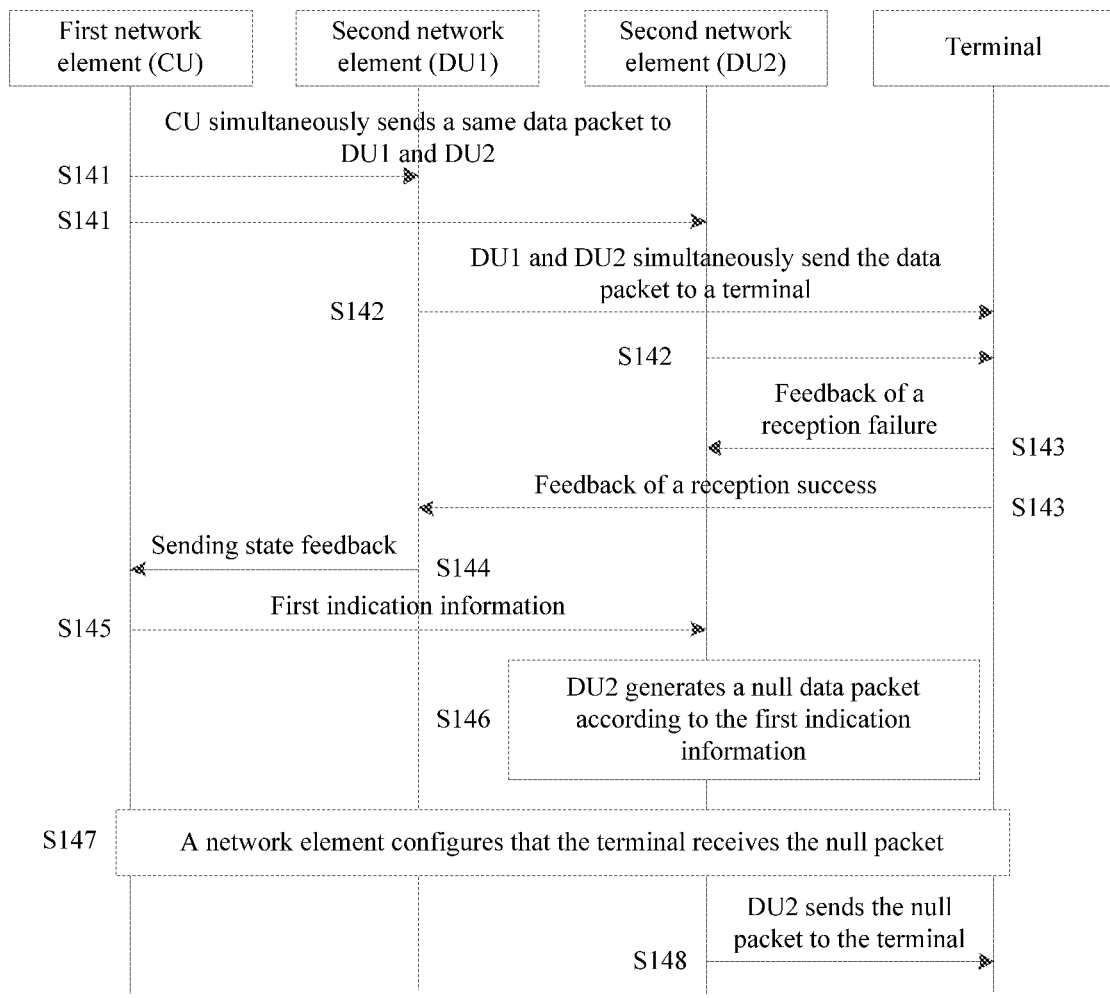
FIG. 14 is a schematic diagram illustrating that a terminal is notified that a data packet is a null packet via control signaling configuration according to an embodiment of the present disclosure.

FIG. 14 is a schematic diagram illustrating that a terminal is notified that a data packet is a null packet via control signaling configuration according to an embodiment of the present disclosure. FIG. 14 differs from FIG. 13 in that the terminal is notified of information of the null packet via the control signaling. The steps described below may be included.

In step S141, a first network element CU simultaneously sends a same data packet to a second network element DU1 and a second network element DU2. The first network element is connected to each second network element through a fronthaul interface. Here, the fronthaul interface is defined as the "NGx" interface for convenience of description.

In step S142, the second network element DU1 and the second network element DU2 both simultaneously send the data packet to a terminal. The data packet is a complete PDU or a PDU segment.

In step S143, the terminal feeds back feedback information of a reception failure to the second network element DU2 and feeds back feedback information of a reception success to the second network element DU1. The terminal feeds back receiving status of the data packet to the second network element DU1 and the second network element DU2, respectively.

In step S144, the second network element DU1 reports sending status feedback information to the first network element.

In step S145, the first network element generates first indication information according to the sending status feedback information in step S144 and sends the first indication information to the second network element DU2. The sending status feedback information includes at least one of: a data delivery status of the second network element and a sequence number of a next new data packet to be transmitted. The first indication information may be one of: a sequence number, a list of sequence numbers, an interval segment and a list of interval segments.

The first indication information is used for instructing the second network element to delete the data packet indicated by the first indication information, and/or the first indication information is used for indicating the sequence number of the next new data packet to be transmitted by the second network element.

In step S146, the second network element DU2 generates a null data packet according to the instruction of the first indication information.

The second network element DU2 adds null packet indication information to PDU header information. The PDU frame structure of the null data packet is as shown in FIG. 9.

Optionally, the second network element DU2 discards the data packet indicated by the first indication information according to the indication of the first indication information.

In step S147, a network element configures that the terminal receives the null packet. Configuration information includes at least one of: L3 control signaling, L2 control signaling and L1 control signaling. The L3 control signaling may be a radio resource control (RRC) control signaling; the L2 control signaling may be a media access control (MAC) control element (CE); and the L1 control signaling may be a physical layer control signaling such as a physical downlink control channel (PDCCH) or an enhanced PDCCH (ePDCCH).

In step S148, the second network element DU2 sends the null packet to the terminal.

Optionally, after receiving the null packet, the terminal deletes the locally cached data PDU or PDU segment corresponding to the sequence number of the null packet.

Figure 15:
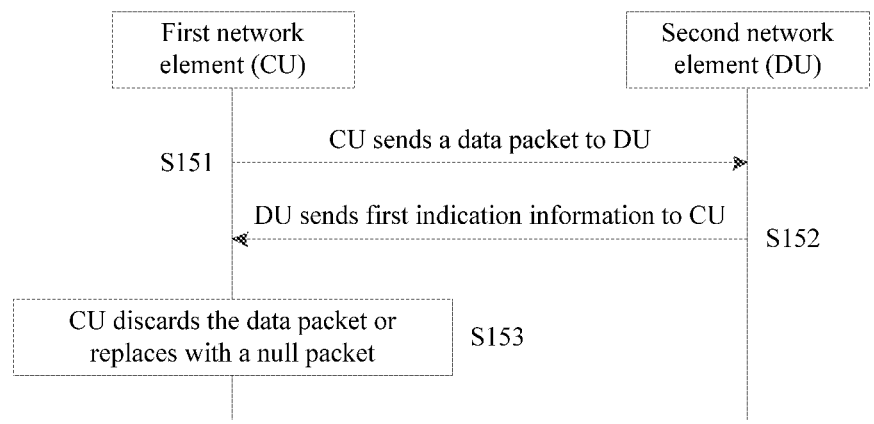
FIG. 15 is a schematic diagram illustrating a sending process of downlink data according to an embodiment of the present disclosure.

FIG. 15 is a schematic diagram illustrating a sending process of downlink data according to an embodiment of the present disclosure. As shown in FIG. 15, the first network element is a CU, the second network element is a DU, and the interface between the CU and the DU is referred to as the NGx interface; the NGx-C is a control plane of a front interface and the NGx-U is a user plane of a fronthaul interface. This embodiment should be applied to a scenario in which the CU sends downlink data of a UE to a plurality of CUs in a downlink data transmission process. After one DU has successfully received the data from the CU, the CU is instructed to discard or delete the data packet which has not been successfully sent to other second network elements (such as DU2) but has been successfully sent to one second network element (such as DU1), thereby improving the data transmission efficiency. The process may include the steps described below.

In step S151, the CU sends a "data sending message" to the DU and notifies the DU of sequence number information of the data packet sent through the NGx-U, and the DU stores the information which may be configured for loss detection of the data packet on the fronthaul interface.

In step S152, after the DU receives the data packet sent by the CU through the NGx-U, the DU immediately notifies the CU with the first indication information that the current data packet has been successfully received through the fronthaul interface.

In step S153, after the CU obtains a notification message, if the data packet has not been sent on another link, the data packet is discarded or replaced with a null packet. The CU confirms which packet has been successfully received by the DU according to the sequence number of the data packet in step S151.

Figure 16:
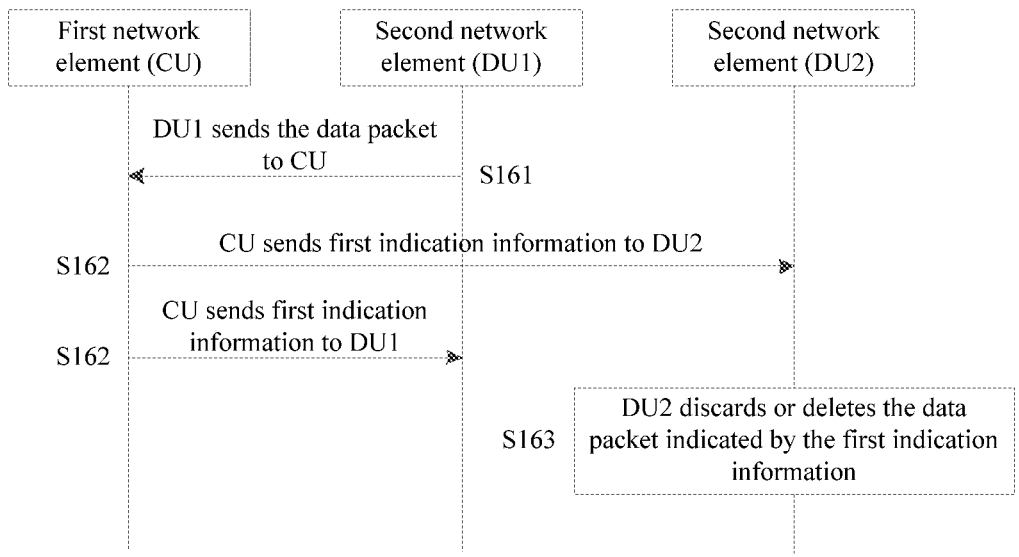
FIG. 16 is a schematic diagram illustrating a sending process of uplink data according to an embodiment of the present disclosure.

FIG. 16 is a schematic diagram illustrating a sending process of uplink data according to an embodiment of the present disclosure. As shown in FIG. 16, the first network element is the CU, the second network element is the DU, and the interface between the CU and the DU is referred to as the NGx interface; the NGx-C is a control plane of a fronthaul interface and the NGx-U is a user plane of a fronthaul interface. This embodiment is applied to a scenario in which a plurality of DUs sends the uplink data of the UE to the CU in an uplink data transmission process. After one DU has successfully sent the data to the CU, the CU instructs other second network elements (such as the DU2) to discard or delete the data packet which has not been successfully received by the CU, thereby improving the data transmission efficiency. The process may include the steps described below.

In step S161, the DUs send the uplink data packet of the UE to the CU through the NGx-U.

In step S162, after the CU receives an uplink data packet sent by one DU, the CU notifies other DUs providing data transmission services for the UE that the current data packet has been successfully received through the fronthaul interface. Optionally, the certain DU may also be notified that the uplink data has been successfully received.

In step S163, after receiving a notification, the other DUs discard the packet or replace it with a null packet. The DUs confirm which specific packet has been successfully received with a sequence number of the data packet in step S161.

In one embodiment, the sequence number (or SN for short) of the data packet here may be a PDCP SN or an RLC SN or a newly-defined user plane interface SN.

From the description of the implementation modes described above, it will be apparent to those skilled in the art that the methods in the embodiments described above may be implemented by software plus a necessary general-purpose hardware platform, or may of course be implemented by hardware; but in many cases, the former is a preferred implementation mode. Based on this understanding, the solution provided by the present disclosure substantially, or the part contributing to the related art, may be embodied in the form of a software product. The computer software product is stored in a storage medium (such as an ROM/RAM, a magnetic disk or an optical disk) and includes several instructions for enabling a terminal device (which may be a mobile phone, a computer, a server, a network device, or the like) to execute the method according to each embodiment of the present disclosure.

Embodiment 2

A data packet transmission device is provided in this embodiment. The device is configured to implement the above-mentioned embodiments and preferred implementation modes. What has been described will not be repeated. As used below, the term "module" may be software, hardware or a combination thereof capable of implementing predetermined functions. The device in the embodiment described below is preferably implemented by software, but implementation by hardware or by a combination of software and hardware is also possible and conceived.

Figure 17:
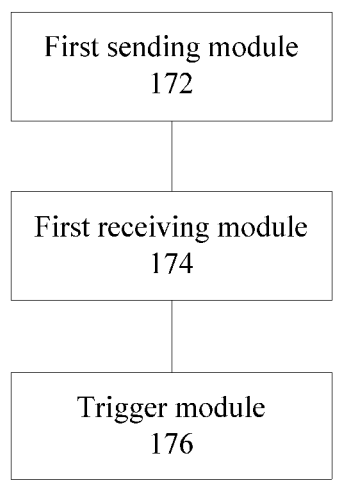
FIG. 17 is a block diagram 1 of a data packet transmission device according to an embodiment of the present disclosure.

FIG. 17 is a block diagram 1 of a data packet transmission device according to an embodiment of the present disclosure. As shown in FIG. 17, the device includes the modules described below.

A first sending module 172 is configured to send a data packet to a terminal.

A first receiving module 174 is connected to the first sending module 172 and configured to receive a delivery status of the data packet fed back by the terminal.

A trigger module 176 is connected to the first receiving module 174 and configured to feed back the delivery status to a first network element and trigger the first network element to generate first indication information according to the delivery status, where the first indication information is used for instructing a second network element which has not successfully sent the data packet to the terminal to discard the data packet indicated by the first indication information.

Optionally, the first indication information is used for instructing the second network element which has not successfully sent the data packet to the terminal to discard the data packet indicated by the first indication information in at least one of the following manners: the first indication information is used for instructing the second network element which has not successfully sent the data packet to the terminal to delete the data packet indicated by the first indication information; and the first indication information is used for instructing the second network element which has not successfully sent the data packet to the terminal to send a null data packet to the terminal.

Optionally, in a case where the first indication information is used for instructing the second network element which has not successfully sent the data packet to the terminal to send the null data packet to the terminal and the second network element has not successfully sent the data packet to the terminal, after the delivery status is fed back to the first network element and the first network element is triggered to generate the first indication information according to the delivery status, the trigger module 176 is further configured to add null packet indication information to the data packet, where the null packet indication information is used for indicating that the data packet sent to the terminal is the null data packet; and to send the data packet to the terminal to enable the terminal to delete a packet data unit (PDU) or a PDU segment corresponding to the null data packet in a cache.

Optionally, the first indication information is further used for indicating a sequence number of at least one data packet to be transmitted by at least two second network elements.

Optionally, the first indication information includes at least one of: a sequence number of the data packet, a list of sequence numbers of data packets, an interval segment of sequence numbers corresponding to data packets and a list of interval segments.

Figure 18:
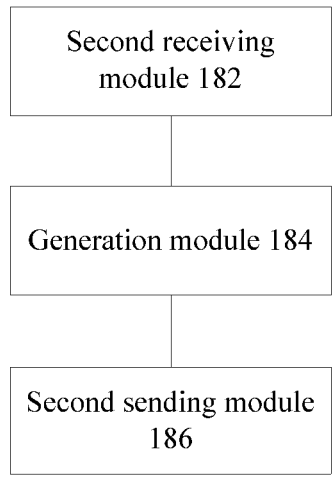
FIG. 18 is a block diagram 2 of a data packet transmission device according to an embodiment of the present disclosure.

FIG. 18 is a block diagram 2 of a data packet transmission device according to an embodiment of the present disclosure. As shown in FIG. 18, the device includes the modules described below. A second receiving module 182 is configured to receive a data packet sent by a first network element. A generation module 184 is connected to the second receiving module 182 and configured to generate second indication information according to a receiving status of the data packet. A second sending module 186 is connected to the generation module 184 and configured to send the second indication information to the first network element, where the second indication information is used for indicating the receiving status of the data packet.

Optionally, the second indication information is further used for indicating a sequence number of at least one data packet to be transmitted by a second network element.

Optionally, the second indication information is transmitted through an interface between the second network element and the first network element.

Figure 19:
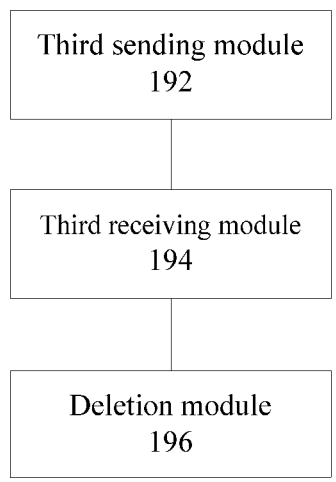
FIG. 19 is a block diagram 3 of a data packet transmission device according to an embodiment of the present disclosure.

FIG. 19 is a block diagram 3 of a data packet transmission device according to an embodiment of the present disclosure. As shown in FIG. 19, the device includes the modules described below. A third sending module 192 is configured to send a same data packet to at least two second network elements. A third receiving module 194 is connected to the third sending module 192 and configured to receive third indication information fed back by a second network element which has successfully received the data packet in the at least two second network elements, where the third indication information is used for instructing to delete the same data packet which has not been successfully sent to other second network elements. A deletion module 196 is connected to the third receiving module 194 and configured to delete the same data packet which has not been successfully sent to the other second network elements in the at least two second network elements according to the third indication information.

It is to be noted that the various modules described above may be implemented by software or hardware. Implementation by hardware may, but may not necessarily, be performed in the following manners: the various modules described above are located in a same processor or their respective processors.

Embodiment 3

An embodiment of the present disclosure further provides a storage medium. Optionally, in this embodiment, the storage medium may be configured to store program codes for executing the steps described below. In S1, a second network element sends a data packet to a terminal. In S2, the second network element receives a delivery status of the data packet fed back by the terminal. In S3, the second network element feeds back the delivery status to a first network element and triggers the first network element to generate first indication information according to the delivery status, where the first indication information is used for instructing the second network element which has not successfully sent the data packet to the terminal to discard the data packet indicated by the first indication information.

Optionally, the storage medium is further configured to store program codes for executing the step described below. In S1, the first indication information is used for instructing the second network element which has not successfully sent the data packet to the terminal to discard the data packet indicated by the first indication information in at least one of the following manners: the first indication information is used for instructing the second network element which has not successfully sent the data packet to the terminal to delete the data packet indicated by the first indication information; and the first indication information is used for instructing the second network element which has not successfully sent the data packet to the terminal to send a null data packet to the terminal.

Optionally, the storage medium is further configured to store program codes for executing the steps described below. In a case where the first indication information is used for instructing the second network element which has not successfully sent the data packet to the terminal to send the null data packet to the terminal and the second network element has not successfully sent the data packet to the terminal, after the delivery status is fed back to the first network element and the first network element is triggered to generate the first indication information according to the delivery status, the steps further include S1 in which the second network element adds null packet indication information to the data packet, where the null packet indication information is used for indicating that the data packet sent to the terminal is the null data packet; and S2 in which the second network element sends the data packet to the terminal to enable the terminal to delete a packet data unit (PDU) or a PDU segment corresponding to the null data packet in a cache.

Optionally, the storage medium is further configured to store program codes for executing the step described below. In S1, the first indication information is further used for indicating a sequence number of at least one data packet to be transmitted by at least two second network elements.

Optionally, the storage medium is further configured to store program codes for executing the step described below. In S1, the first indication information includes at least one of: a sequence number of the data packet, a list of sequence numbers of data packets, an interval segment of sequence numbers corresponding to data packets and a list of interval segments.

An embodiment of the present disclosure further provides a storage medium.

Optionally, in this embodiment, the storage medium may be configured to store program codes for executing the steps described below. In S1, the second network element receives a data packet sent by the first network element. In S2, the second network element generates second indication information according to a receiving status of the data packet. In S3, the second network element sends the second indication information to the first network element, where the second indication information is used for indicating the receiving status of the data packet.

Optionally, the storage medium is further configured to store program codes for executing the step described below. In S1, the second indication information is further used for indicating a sequence number of at least one data packet to be transmitted by the second network element.

Optionally, the storage medium is further configured to store program codes for executing the step described below. In S1, the second indication information is transmitted through an interface between the second network element and the first network element.

An embodiment of the present disclosure further provides a storage medium.

Optionally, in this embodiment, the storage medium may be configured to store program codes for executing the steps described below. In S1, the first network element sends a same data packet to at least two second network elements. In S2, the first network element receives third indication information fed back by a second network element which has successfully received the same data packet in the at least two second network elements, where the third indication information is used for instructing the first network element to delete the same data packet which has not been successfully sent to an other second network element. In S3, the first network element deletes the same data packet which has not been successfully sent to the other second network element in the at least two second network elements according to the third indication information.

Optionally, the storage medium is further configured to store program codes for executing the step described below.

In S1, the third indication information is further used for indicating a sequence number of at least one data packet to be transmitted by the at least two second network elements.

Optionally, the storage medium is further configured to store program codes for executing the step described below. In S1, the third indication information is transmitted through an interface between the first network element and each of the at least two second network elements.

Optionally, in this embodiment, the storage medium may include, but is not limited to, a U disk, a read-only memory (ROM), a random access memory (RAM), a mobile hard disk, a magnetic disk, an optical disk or another medium capable of storing the program codes.

Optionally, in this embodiment, a processor executes, according to the program codes stored in the storage medium, the following steps: a second network element sends a data packet to a terminal; the second network element receives a delivery status of the data packet fed back by the terminal; and the second network element feeds back the delivery status to a first network element and triggers the first network element to generate first indication information according to the delivery status, where the first indication information is used for instructing the second network element which has not successfully sent the data packet to the terminal to discard the data packet indicated by the first indication information.

Optionally, in this embodiment, the processor executes, according to the program codes stored in the storage medium, the following step: the first indication information is used for instructing the second network element which has not successfully sent the data packet to the terminal to discard the data packet indicated by the first indication information in at least one of the following manners: the first indication information is used for instructing the second network element which has not successfully sent the data packet to the terminal to delete the data packet indicated by the first indication information; and the first indication information is used for instructing the second network element which has not successfully sent the data packet to the terminal to send a null data packet to the terminal.

Optionally, in this embodiment, the processor executes, according to the program codes stored in the storage medium, the following steps: in a case where the first indication information is used for instructing the second network element which has not successfully sent the data packet to the terminal to send the null data packet to the terminal and the second network element has not successfully sent the data packet to the terminal, after the delivery status is fed back to the first network element and the first network element is triggered to generate the first indication information according to the delivery status, the second network element adds null packet indication information to the data packet, where the null packet indication information is used for indicating that the data packet sent to the terminal is the null data packet; and the second network element sends the data packet to the terminal to enable the terminal to delete a packet data unit (PDU) or a PDU segment corresponding to the null data packet in a cache.

Optionally, in this embodiment, the processor executes, according to the program codes stored in the storage medium, the following step: the first indication information is further used for indicating a sequence number of at least one data packet to be transmitted by at least two second network elements.

Optionally, in this embodiment, the processor executes, according to the program codes stored in the storage medium, the following step: the first indication information includes at least one of: a sequence number of the data packet, a list of sequence numbers of data packets, an interval segment of sequence numbers corresponding to data packets and a list of interval segments.

Optionally, in this embodiment, the processor executes, according to the program codes stored in the storage medium, the following steps: the second network element receives a data packet sent by the first network element; the second network element generates second indication information according to a receiving status of the data packet; and the second network element sends the second indication information to the first network element, where the second indication information is used for indicating the receiving status of the data packet.

Optionally, in this embodiment, the processor executes, according to the program codes stored in the storage medium, the following step: the second indication information is further used for indicating a sequence number of at least one data packet to be transmitted by the second network element.

Optionally, in this embodiment, the processor executes, according to the program codes stored in the storage medium, the following step: the second indication information is transmitted through an interface between the second network element and the first network element.

Optionally, in this embodiment, the processor executes, according to the program codes stored in the storage medium, the following steps: the first network element sends a same data packet to at least two second network elements; the first network element receives third indication information fed back by a second network element which has successfully received the same data packet in the at least two second network elements, where the third indication information is used for instructing the first network element to delete the same data packet which has not been successfully sent to other second network elements; and the first network element deletes the same data packet which has not been successfully sent to the other second network elements in the at least two second network elements according to the third indication information.

Optionally, in this embodiment, the processor executes, according to the program codes stored in the storage medium, the following step: the third indication information is further used for indicating a sequence number of at least one data packet to be transmitted by the at least two second network elements.

Optionally, in this embodiment, the processor executes, according to the program codes stored in the storage medium, the following step: the third indication information is transmitted through an interface between the first network element and each of the at least two second network elements.

Optionally, for examples in this embodiment, reference may be made to the examples described in the embodiments and optional implementation modes described above, and the examples will not be repeated in this embodiment.

Apparently, it should be understood by those skilled in the art that each of the above-mentioned modules or steps of the present disclosure may be implemented by a general-purpose computing device, the modules or steps may be concentrated on a single computing device or distributed on a network formed by multiple computing device, and alternatively, the modules or steps may be implemented by program codes executable by the computing devices, so that modules or steps may be stored in a storage device and executable by the computing devices. In some circumstances, the illustrated or described steps may be executed in sequences different from those described herein, or the illustrated or described steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

What is claimed is:

1. A data packet transmission method, comprising:
   simultaneously sending, by a centralized unit (CU), a data packet to a first distributed unit (DU1) and a second distributed unit (DU2);
   receiving, by the centralized unit (CU), from the first distributed unit (DU1) a delivery status of the data packet and a sequence number of a next new data packet to be transmitted,
   generating, by a first network element and in response to the receiving the delivery status, an indication information of the data packet to be discarded and of the next new data packet to be transmitted,
   wherein the indication information comprises a sequence number of the data packet, and
   wherein the indication information comprises the sequence number of the next new data packet to be transmitted; and
   sending, by the first network element, the indication information that instructs a second network element to discard the data packet indicated by the indication information and to transmit the next new data packet,
   wherein the second network element is configured to transmit the data packet to a terminal,
   wherein the first network element comprises the centralized unit (CU), and
   wherein the second network element comprises the second distributed unit (DU2).

2. The method of claim 1, wherein the indication information includes a list of sequence numbers for a plurality of data packets to be discarded.

3. The method of claim 2, wherein the indication information comprises an interval segment of sequence numbers corresponding to the plurality of data packets.

4. The method of claim 2, wherein the indication information comprises a list of interval segments.

5. The method of claim 1, wherein the first network element includes a centralized unit (CU) and the second network element includes a distributed unit (DU).

6. The method of claim 1, wherein the first network element sends the indication information to the second network element via a fronthaul interface.

7. A non-transitory computer storage medium storing executive instructions, wherein the executive instructions are configured to execute a method comprising:
   simultaneously sending, by a centralized unit (CU), a data packet to a first distributed unit (DU1) and a second distributed unit (DU2);
   receiving, by the centralized unit (CU), from the first distributed unit (DU1) a delivery status of the data packet and a sequence number of a next new data packet to be transmitted, generating, by a first network element and in response to the receiving the delivery status, an indication information of the data packet to be discarded and of the next new data packet to be transmitted,
    wherein the indication information comprises a sequence number of the data packet, and
    wherein the indication information comprises the sequence number of the next new data packet to be transmitted; and
sending, by the first network element, the indication information that instructs a second network element to discard the data packet indicated by the indication information and to transmit the next new data packet,
    wherein the second network element is configured to transmit the data packet to a terminal,
    wherein the first network element comprises the centralized unit (CU), and
    wherein the second network element comprises the second distributed unit (DU2).

8. The non-transitory computer storage medium of claim 7, wherein the indication information includes a list of sequence numbers for a plurality of data packets to be discarded.

9. The non-transitory computer storage medium of claim 8, wherein the indication information comprises an interval segment of sequence numbers corresponding to the plurality of data packets.

10. The non-transitory computer storage medium of claim 8, wherein the indication information comprises a list of interval segments.

11. The non-transitory computer storage medium of claim 7, wherein the first network element includes a centralized unit (CU) and the second network element includes a distributed unit (DU).

12. The non-transitory computer storage medium of claim 7, wherein the first network element sends the indication information to the second network element via a fronthaul interface.

13. A first network element comprising a processor configured to:
    simultaneously send a data packet to a first distributed unit (DU1) and a second distributed unit (DU2);
    receive from the first distributed unit (DU1) a delivery status of the data packet and a sequence number of a next new data packet to be transmitted,
    generate, in response to the receive the delivery status, an indication information of the data packet to be discarded and of the next new data packet to be transmitted,
        wherein the indication information comprises a sequence number of the data packet, and
        wherein the indication information comprises the sequence number of the next new data packet to be transmitted; and
    send the indication information that instructs a second network element to discard the data packet indicated by the indication information and to transmit the next new data packet,
        wherein the second network element is configured to transmit the data packet to a terminal,
        wherein the first network element comprises the centralized unit (CU), and
        wherein the second network element comprises the second distributed unit (DU2).

14. The first network element of claim 13, wherein the indication information includes a list of sequence numbers for a plurality of data packets to be discarded.

15. The first network element of claim 14, wherein the indication information comprises an interval segment of sequence numbers corresponding to the plurality of data packets.

16. The first network element of claim 14, wherein the indication information comprises a list of interval segments.

17. The first network element of claim 13, wherein the first network element includes a centralized unit (CU) and the second network element includes a distributed unit (DU).

18. The first network element of claim 13, wherein the first network element sends the indication information to the second network element via a fronthaul interface.

* * * * *

UNITED STATES PATENT AND TRADEMARK OFFICE
CERTIFICATE OF CORRECTION

PATENT NO. : 11,206,106 B2
APPLICATION NO. : 16/786985
DATED : December 21, 2021
INVENTOR(S) : He et al.

It is certified that error appears in the above-identified patent and that said Letters Patent is hereby corrected as shown below:

On the Title Page

In the Figure, for Step "S404", in Line 1, delete "transmission state" and insert -- delivery status --, therefor.

In the Figure, for Step "S406", in Line 1, delete "transmission state" and insert -- delivery status --, therefor.

In the Drawings

In Fig. 4, Sheet 2 of 10, for Step "S404", in Line 1, delete "transmission state" and insert -- delivery status --, therefor.

In Fig. 4, Sheet 2 of 10, for Step "S406", in Line 1, delete "transmission state" and insert -- delivery status --, therefor.

In Fig. 7, Sheet 4 of 10, delete "state feedback" and insert -- status feedback --, therefor.

In Fig, 14, Sheet 8 of 10, for Step "S144", in Line 1, delete "state feedback" and insert -- status feedback --, therefor.

In the Specification

In Column 7, Line 25, delete "between among" and insert -- among --, therefor.

In Column 8, Lines 26-27, delete "microprocessor MCU or a programmable logic device FPGA)," and insert -- microcontroller unit (MCU) or a field-programmable gate array (FPGA)), --, therefor.

In Column 12, Line 34, delete "plurality second" and insert -- plurality of second --, therefor.

Signed and Sealed this
Ninth Day of August, 2022

*Katherine Kelly Vidal*

Katherine Kelly Vidal
*Director of the United States Patent and Trademark Office*

CERTIFICATE OF CORRECTION (continued)
U.S. Pat. No. 11,206,106 B2

In Column 13, Line 65, delete "(URLLC)" and insert -- (URLLCs) --, therefor.

In Column 17, Lines 49-50, delete "front interface" and insert -- fronthaul interface --, therefor.

In Column 18, Line 26, delete "the DUs" and insert -- the DU1 --, therefor.

In Column 18, Line 29, delete "one DU," and insert -- DU1, --, therefor.

In Column 21, Lines 29-38, delete "Optionally, in . . . . packet." and insert the same at Line 28, after "medium." as a continuation paragraph.

In Column 21, Lines 51-65, delete "Optionally, in . . . . information." and insert the same at Line 50, after "medium." as a continuation paragraph.

In the Claims

In Column 24, Line 24, in Claim 1, delete "transmitted," and insert -- transmitted; --, therefor.

In Column 24, Line 53, in Claim 5, delete "a centralized unit (CU)" and insert -- the centralized unit (CU) --, therefor.

In Column 24, Line 67, in Claim 7, delete "transmitted," and insert -- transmitted; --, therefor.

In Column 25, Lines 35-36, in Claim 11, delete "a centralized unit (CU)" and insert -- the centralized unit (CU) --, therefor.

In Column 26, Line 7, in Claim 13, delete "transmitted," and insert -- transmitted; --, therefor.